US 8,542,626 B2

(12) United States Patent
Voisin et al.

(10) Patent No.: US 8,542,626 B2
(45) Date of Patent: Sep. 24, 2013

(54) MULTI-SPOT TRANSMISSION AND RECEPTION SYSTEM ON BOARD A SATELLITE AND SATELLITE COMPRISING SUCH A SYSTEM

(75) Inventors: Philippe Voisin, Ville (FR); Didier Leboulc'h, Castelginest (FR); Bruno Trancart, Portet sur Garonne (FR)

(73) Assignee: THALES, Neuilly-sur-Seine (FR)

( * ) Notice: Subject to any disclaimer, the term of this patent is extended or adjusted under 35 U.S.C. 154(b) by 357 days.

(21) Appl. No.: 12/972,059

(22) Filed: Dec. 17, 2010

(65) Prior Publication Data

US 2011/0317620 A1 Dec. 29, 2011

(30) Foreign Application Priority Data

Dec. 18, 2009 (FR) .................................... 09 06178

(51) Int. Cl.
*H04B 7/185* (2006.01)
*H04B 7/204* (2006.01)

(52) U.S. Cl.
USPC ........................... 370/316; 370/481; 370/319

(58) Field of Classification Search
USPC ................. 370/316; 342/352, 353; 398/121, 398/124, 125; 725/66
See application file for complete search history.

(56) References Cited

U.S. PATENT DOCUMENTS

| 5,640,386 | A | * | 6/1997 | Wiedeman | ..................... | 370/320 |
| 5,822,312 | A | * | 10/1998 | Peach et al. | .................... | 370/323 |
| 5,825,325 | A | * | 10/1998 | O'Donovan et al. | .......... | 342/353 |
| 6,226,491 | B1 | * | 5/2001 | Wachs et al. | .................. | 455/12.1 |
| 6,708,029 | B2 | * | 3/2004 | Wesel | ............................ | 455/428 |
| 8,315,199 | B2 | * | 11/2012 | Dankberg et al. | ............. | 370/316 |
| 2009/0161598 | A1 | * | 6/2009 | Dale et al. | ...................... | 370/323 |
| 2009/0243719 | A1 | * | 10/2009 | Voisin et al. | ................... | 330/126 |
| 2011/0110401 | A1 | * | 5/2011 | Leong et al. | .................. | 375/211 |

FOREIGN PATENT DOCUMENTS

| GB | 2 326 979 A | 1/1999 |
| WO | 98/05132 A2 | 2/1998 |

* cited by examiner

*Primary Examiner* — Huy D. Vu
*Assistant Examiner* — Omer Mian
(74) *Attorney, Agent, or Firm* — Baker & Hostetler, LLP

(57) ABSTRACT

A multi-spot transmission and reception system includes at least one outbound section implementing the reception of a hub frequency band and its transposition into user transmission sub-bands, at least one return section implementing the reception of user frequency sub-bands, and their transposition into a hub transmission band and a mesh section comprising a digital transparent processor DTP. The mesh section includes: frequency sampling and recombining means to sample, on user reception sub-bands a mesh band fraction, and to recombine the sampled mesh band fractions on an input of the DTP; and frequency division and reinjection means to divide the frequency band routed to an output of the DTP, into band fractions, and to reinject the band fractions obtained into the user transmission sub-bands. An application of the system is to repeaters on board telecommunications satellites.

10 Claims, 7 Drawing Sheets

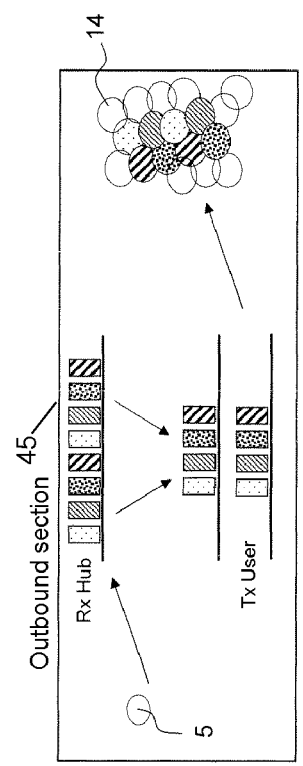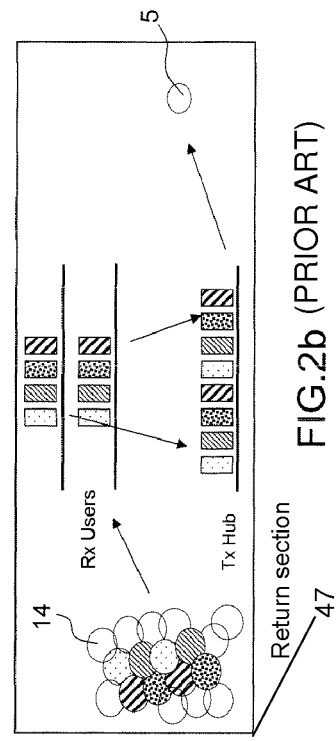
FIG.2a (PRIOR ART)
FIG.2b (PRIOR ART)

MULTI-SPOT TRANSMISSION AND RECEPTION SYSTEM ON BOARD A SATELLITE AND SATELLITE COMPRISING SUCH A SYSTEM

CROSS-REFERENCE TO RELATED APPLICATION

This application claims priority to foreign French patent application No. FR 0906178, filed on Dec. 18, 2009, the disclosure of which is incorporated by reference in its entirety.

FIELD OF THE INVENTION

The present invention relates to a multi-spot transmission and reception system on board a satellite and a satellite comprising such a system. It applies notably to the field of satellite telecommunications and, more particularly, to high definition television applications and multimedia applications.

BACKGROUND OF THE INVENTION

For high definition television applications and multimedia applications, the repeaters mounted on board known communication satellites comprise multi-spot transmission and reception systems which are based on transparent architectures offering uplinks between one or more earth stations and the repeater and downlinks between the repeater and a plurality of users. Current architectures do not allow the implementation of direct links between the users, referred to as inter-spot links or mesh links, and impose a fixed connectivity between the spots of the users and the earth stations.

FIGS. 1a and 1b show an example of the architecture of a transmission and reception system of a current repeater, offering uplinks and downlinks respectively. The transmission and reception system providing the links between at least one earth station, also referred to as a hub, and users comprises at least one outbound section 45 corresponding to the transmission of signals transmitted by the earth station to users, and at least one return section 47 corresponding to the transmission of signals transmitted by users to the earth station. The number of outbound sections and return sections is equal to the number of earth stations deployed.

Each forward or outbound section, as shown schematically in the example in FIG. 1a, generally comprises a reception antenna 6 comprising a hub reception source dedicated to the reception of signals 5 originating from a single earth station. In the case where a plurality of earth stations are deployed, the reception antenna 6 comprises a plurality of hub reception sources 1 to N, where N is an integer greater than 1, each hub reception source being dedicated to the reception of signals originating from a single earth station. The signals received by a hub source, for example by the hub reception source 1, allow a plurality of user spots 14 to be served, each user spot 14, also referred to as a beam, corresponding to the coverage of a predetermined terrestrial geographical zone. The user spots are transmitted by one or more user transmission antennas 7. For example, four user transmission antennas are shown in FIG. 1a. The radio frequency signals transmitted by an earth station generally occupy a broad frequency band. These hub signals 5 are received by a transmission channel linked, for example, to the hub reception source 1 of the hub reception antenna 6. The broadband signals received pass through a filter 11 which enables the useful hub reception frequency band RX to be filtered, and then through a low noise amplifier 12, and are frequency-transposed by one or more frequency converters 13 to pass from the hub reception frequency band RX to the user transmission frequency band TX. The frequency band allocated to the user spots 14 being generally narrower than the band allocated to the earth stations, the use of a plurality of frequency converters 13 furthermore allows the transmission band to be doubled up, i.e. it allows frequency bands which were disjointed on reception to be brought back to the same central transmission frequency. This is generally necessary to occupy a transmission frequency band that is generally narrower than the reception band. It is thus possible to occupy a transmission band that is twice as narrow as the reception band, or even more depending on requirements. The number of converters used is therefore equal to the ratio between the width of the hub reception band RX and the width of the user transmission band TX. In this example, following amplification, a divider 15 implements a division by two of the power of the signal and the two signals resulting from the division are frequency-transposed by two frequency converters 13 which, as shown in FIG. 2a, allow the received frequency band to be split into two bands which, following frequency conversion 13, will be centred on the same frequency and will be twice as narrow as the received frequency band. The signals whose frequencies correspond to the two transmission frequency bands thus constituted are then transmitted respectively to two input demultiplexers IMUX 16 (Input Multiplexer) which split them into a plurality of contiguous sub-bands, each sub-band having a fixed width and being adjustable, for example on the ground, according to transmission frequency requirements. Through these successive stages described above, four independent transmission sub-bands $U_j, \ldots, U_{j+3}$, are thus constituted on the basis of a single broadband reception and are shown in the example in FIG. 1a. Each of these transmission sub-bands is dedicated to the transmission of radio frequency signals to a predetermined user spot 14. A colour code is generally allocated to each sub-band to represent the transmission frequency sub-bands transmitted to the user spots 14. This colour code defines the resources used. Each colour therefore corresponds to a frequency resource defined by the central frequency of the frequency band of the signal. In the case of FIG. 2a, eight user transmission frequency sub-bands TX are generated on the basis of the reception of a hub band RX originating from a hub spot 5. Following frequency transposition 13, certain sub-bands are at the same central frequency and are allocated the same colour even though each of the sub-bands is intended for different user spots 14. In this example, the eight user transmission frequency sub-bands TX generate four different colours, each colour therefore being used twice. Each transmission frequency sub-band (or colour) is then amplified by a pre-amplifier 17 then by a progressive wave tube 18 followed by a filter 19 which implement a power amplification and a filtering of the non-linearities so that the user sources 20 only transmit the useful frequency spectrum to the user spots 14.

Each return or inbound section 47, as shown schematically in the example in FIG. 1b, is inverted in relation to the outbound section and comprises reception user sources 21, each intended to receive radio frequency signals in a narrow reception frequency band and able to transmit the received signals to a receiving earth station. In the case of the use of antennas operating on transmission and reception, the reception user sources 21 are the same as the transmission user sources 20 of the outbound section. The reception user sources 21 are each connected respectively to a filter 22 followed by a gain control low noise amplifier 23 which enables control of the respective levels received on each user reception channel $U_j, \ldots, U_{j+3}$ corresponding to each source 21. Following amplification, the signals received in the contiguous frequency sub-bands $U_j, \ldots, U_{j+3}$ are recombined by input multiplexers IMUX 24 to reconstruct a broader-band frequency spectrum, and are then transposed into the transmission frequency band TX by one or more frequency converters 25. The signals from the frequency converters 25 are recombined by a signal combiner 26 to reconstitute the total band allocated to the earth station, as shown in FIG. 2b, and to transmit, after amplification in the channel amplifiers 27 and power amplifiers 28 and after filtering 29, the different signals from the user antennas 7 to the earth station by a dedicated hub transmission source of the hub antenna 6, whereby the hub transmission sources may be the same as the hub reception sources 1 to N in the case of the use of transmission and reception antennas.

This type of architecture only allows the provision of uplinks and downlinks between earth stations and user spots and does not allow the implementation of direct inter-spot links between users. To implement inter-spot links, it is known, as shown in the architecture example in FIG. 3, for the repeater to be equipped with an additional link section, referred to as the mesh section, which is intended to provide inter-spot links only, the mesh section comprising a digital transparent processor (DTP) 31. The DTP 31 comprises input access points 32, each dedicated to the reception of signals originating from a first user spot 14 and output access points 33, each dedicated to the retransmission of the received signals to a second destination user spot 43. Each input access point 32 of the DTP 31 is connected to a signal reception source 36 via a dedicated reception frequency conversion channel, and each output access point of the DTP 31 is connected to a radio frequency signal transmission source 37 via a dedicated transmission frequency conversion channel. In each reception frequency conversion channel, the signals received by each reception source 36 are previously filtered by a filter 34 and amplified in a low noise amplifier 35 then frequency-converted in a converter 38. The DTP 31 implements a fine digital filtering which enables the division of the frequency bands of the received signals originating from each user spot into a plurality of sub-bands with narrower widths, each sub-band resulting from the division being dedicated to a single user, and implements a routing of each sub-band then a reorganisation of said sub-bands in such a way as to reconstitute the bands dedicated to each destination user spot 43, the reorganised bands being respectively delivered to the output access points 33 of the DTP 31 and transmitted on the corresponding transmission frequency conversion channels. Following frequency conversion 39 then amplification 40, 41 and filtering 42, the transmission sources 37 connected to each transmission frequency conversion channel retransmit the signals to the destination user spots 43.

However, the processing capacities of a DTP 31 are limited in terms of bandwidth that can be processed per access point and in terms of total processing capacity corresponding to the product of the capacity per access point times the number of access points 32, 33 of the DTP. These limitations do not permit the processing of a large number of connections between the spots 36 to be retransmitted and the destination spots 43. Currently, the processing capacity of a DTP is in the order of 2000 MHz, the capacity per access point is 250 MHz and the number of access points of the DTP is limited to eight user spots in total, whereas the typical service requirements for a payload are twenty-four user spots. To increase the processing capacity of the DTP 31, it is possible to limit the frequency band of each access point, for example to 50 MHz, but this multiplies the number of frequency conversion channels on either side of the DTP 31. For example, in the case of 80 user spots, 160 frequency conversion channels are necessary, which increases the complexity of the architecture around the DTP 31, the number of conversion channels on either side of the DTP and the DTP itself.

SUMMARY OF THE INVENTION

A first object of the invention is to implement a new repeater architecture on board a satellite which does not include the disadvantages of the existing architectures, enabling the implementation of uplinks and downlinks between one or more earth stations and user spots and enabling the implementation of a large number of direct inter-spot links between the users and using a DTP of reduced size and mass, with minimised complexity, having a number of input and output access points which is much lower than the number of user inter-spot connections to be implemented and enabling minimisation of the number of conversion channels upstream and downstream of the DTP.

A second object of the invention is to implement a new repeater architecture allowing a set of user spots to be served even if the number of stations on the ground is insufficient.

For this purpose, the invention relates to a multi-spot transmission and reception system on board a satellite comprising at least one outbound section comprising a hub reception channel intended to receive first signals originating from an earth station and at least two user transmission channels intended to transmit the first signals to geographical coverage zones corresponding to users, referred to as user spots, at least one return section comprising at least two user reception channels intended to receive second signals originating from user spots and a hub transmission channel intended to transmit second signals to the earth station, and an additional link section, referred to as the mesh section, intended to provide inter-spot links, the mesh section comprising a digital transparent processor DTP intended to filter and route signals from a first user spot to a second user spot.

According to the invention, the mesh section furthermore comprises:
- means for frequency sampling and recombining, comprising at least two inputs connected to the return section, and an output connected to an input of the DTP, to sample, respectively, on the at least two user reception channels, two first frequency band fractions, referred to as mesh band fractions, and to recombine the first two sampled mesh band fractions into a single frequency band applied to an input of the DTP,
- frequency division and reinjection means comprising an input connected to an output of the DTP, and at least two outputs connected to an outbound section, to divide the frequency band routed to the same output of the DTP into at least two second frequency band fractions, and to reinject, respectively on the at least two user transmission channels, the second frequency band fractions obtained following division.

Advantageously, the frequency sampling and recombining means comprise an input multiplexer IMUX and frequency division and reinjection means comprising at least one output demultiplexer.

The multi-spot transmission and reception system according to the invention may comprise other additional characteristics which may be taken separately and/or in combination, and notably:
- the mesh band fraction sampled on a user reception channel of a user spot is advantageously identical to the frequency band fraction reinjected on a user transmission frequency channel of the same user spot;

the mesh band fractions sampled on the user reception channels of the same return section advantageously all have the same width and are frequency-shifted in relation to one another, the frequency shift being equal to the width of a mesh band fraction, and the sampled mesh band fractions are contiguous;

the total width of the mesh band fractions sampled on the user reception channels of the same return section (47) is advantageously equal to the bandwidth of each user spot;

the multi-spot transmission and reception system may furthermore comprise first selectivity means to connect selectively at least one input access point of the DTP either to user reception channels or, via at least one additional first link, to a hub reception channel, and second selectivity means to connect selectively at least one output access point of the DTP either to user transmission channels or, via at least one additional second link, to a hub transmission channel;

the first selectivity means may comprise a first input selectivity matrix connected in the mesh section between the IMUXs and the inputs of the DTP, and a second output selectivity matrix connected in the mesh section between the outputs of the DTP and the DMUXs;

the second selectivity means may comprise a third selectivity matrix connected to the user reception channels of each return section and connected to the second output selectivity matrix of the mesh section;

the first, second and third selectivity matrices implement "exclusive or" functions.

The invention also relates to a telecommunications satellite comprising a multi-spot transmission and reception system of this type.

BRIEF DESCRIPTION OF THE DRAWINGS

Other characteristics and advantages of the invention will be clearly explained in the description which follows, given as a purely illustrative and non-limiting example, with reference to the attached schematic drawings, in which:

FIG. 2a shows an example illustrating the division of an initial frequency band into two identical frequency bands which are twice as narrow as the initial frequency band;

FIG. 2b shows an example illustrating the combination of two narrow frequency bands into a frequency band which is twice as wide;

DETAILED DESCRIPTION

Figure 1A:
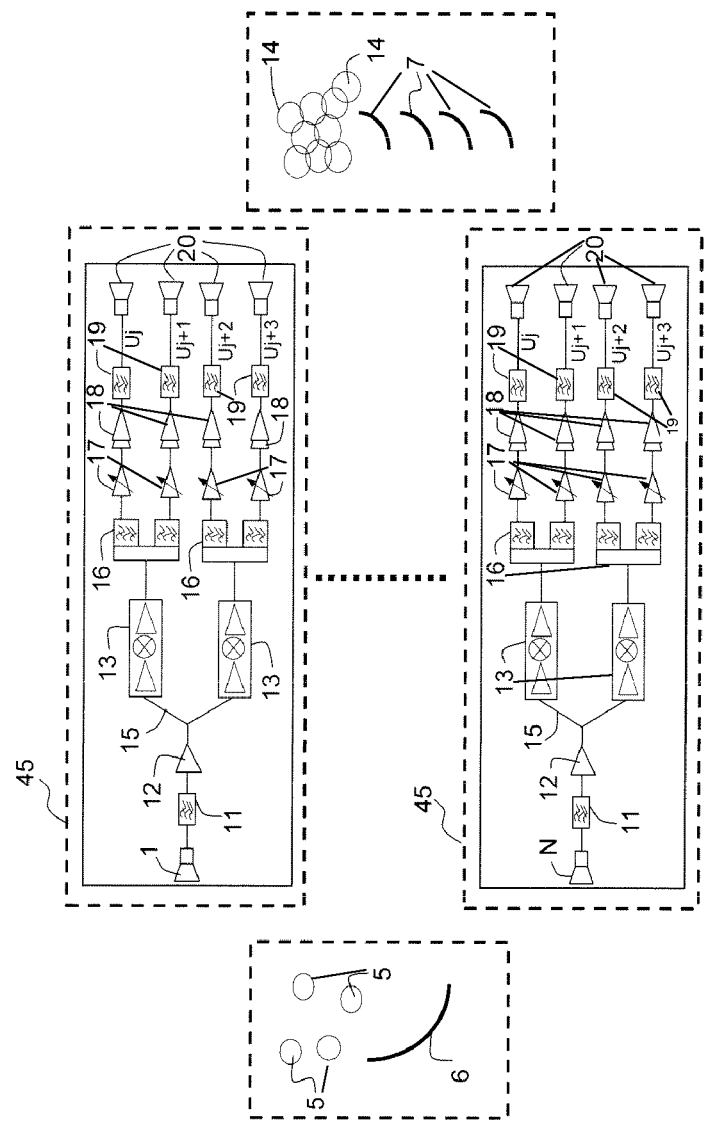
FIGS. 1a and 1b show an example of a payload architecture for the downlinks and the uplinks respectively, according to the prior art.
Figure 1B:
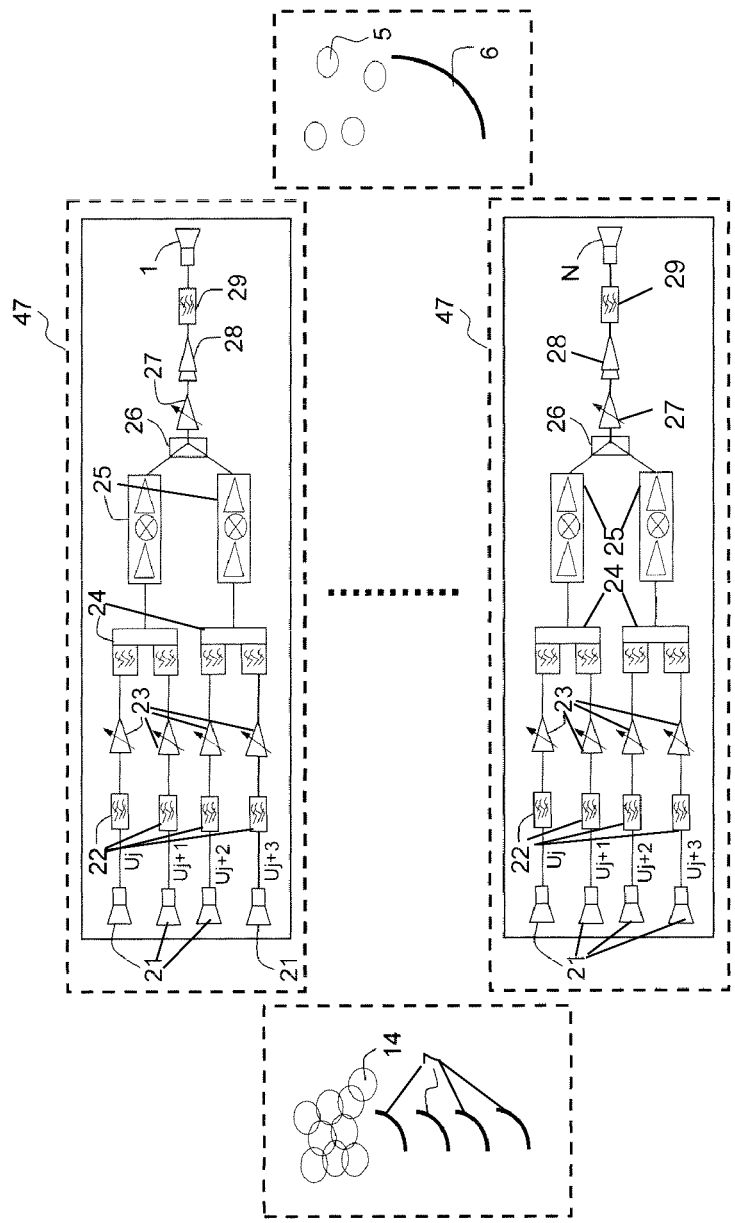
Figure 3:
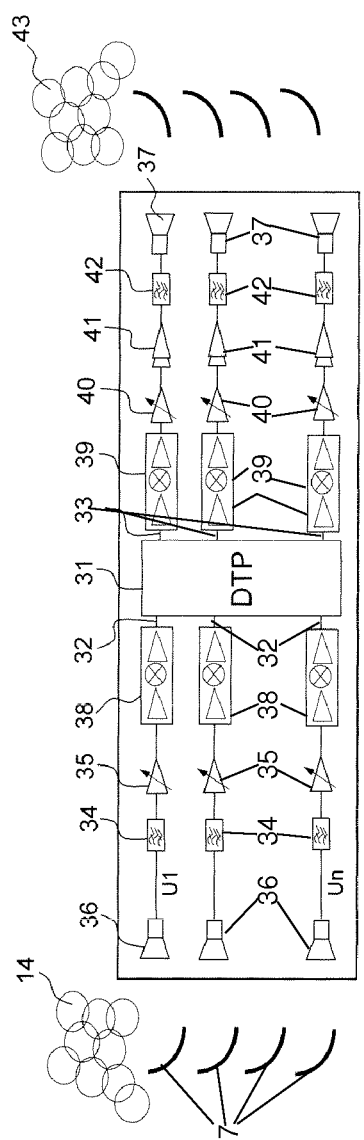
FIG. 3 shows an example of a payload architecture using a DTP and enabling the provision of inter-spot links between users, according to the prior art.
Figure 4:
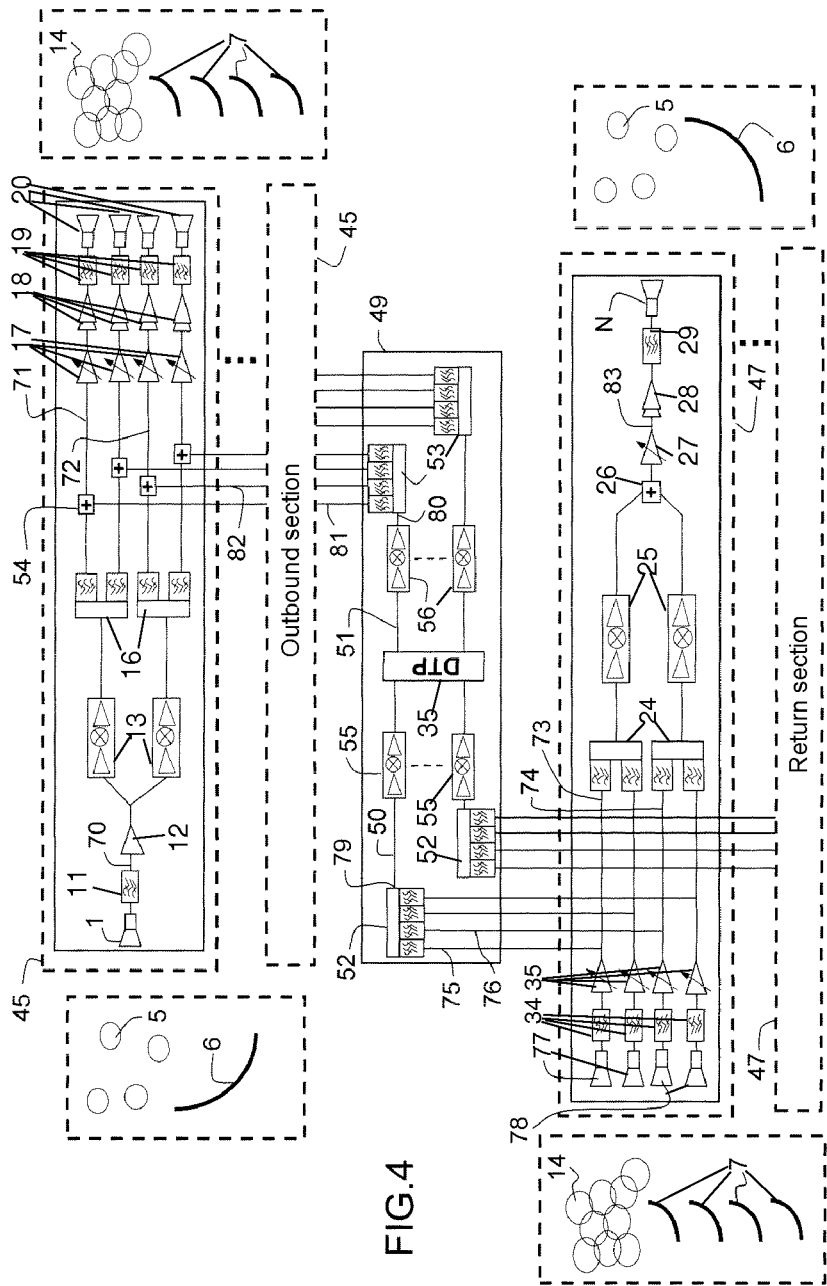
FIG. 4 shows a first example of a payload architecture using a DTP and enabling the provision of inter-spot links between users, according to the invention.

The payload architecture shown in FIG. 4 comprises at least one outbound section 45 comprising a hub reception channel 70 to receive signals 5 originating from an earth station (not shown) and to provide the routing of these signals 5 to user spots 14 via at least two user transmission channels 71, 72, at least one return section 47 comprising at least two user reception channels 73, 74 to receive signals originating from user spots 14, and to provide the routing of the received signals to an earth station via a hub transmission channel 83, and a mesh section 49 providing direct inter-spot links between the users. The number of outbound sections is equal to the number of return sections.

The transmission of the communications between one or more earth stations and a plurality of user spots 14 is implemented via transmission and reception antennas 7 dedicated to user spots 14 and at least one hub transmission and reception antenna 6 comprising hub transmission and reception sources 1 to N, each hub source being dedicated to one earth station. The bandwidth allocated to the earth stations is several times greater than the bandwidth allocated to the user spots 14.

The mesh section 49 comprises a digital transparent processor DTP 35 comprising at least one input and one output, at least one input conversion channel 50 connected to an input of the DTP 35 and at least one output conversion channel 51 connected to an output of the DTP 35, the input and output conversion channels comprising signal frequency conversion means 55, 56 to enable their processing by the DTP 35. According to the invention, the input conversion channel 50 furthermore comprises frequency sampling and recombining means 52 comprising at least two inputs 75, 76 connected respectively to the two user reception channel 73, 74 associated with the two different user reception sources 77, 78 of the return section 47, and an output 79 connected to an input of the DTP 35 via frequency conversion means 55. The output conversion channel 51 furthermore comprises frequency division and reinjection means 53 comprising an input 80 connected to an output of the DTP 35 via frequency conversion means 56 and at least two outputs 81, 82, the two outputs 81, 82 being respectively connected, via combination means 54, to the two user transmission channels 71, 72 of the outbound section 45 to provide the transmission of the combined signal to a user spot 14.

The frequency sampling and recombining means 52 comprise filtering means to sample, on each of the said user reception channels 73, 74, a frequency sub-band, referred to as the mesh band fraction 100 (shown in FIG. 5), corresponding to a fraction of the total band allocated to each user spot 14, and means to recombine the set of sampled mesh band fractions 100 into a mesh band with a width identical to that allocated to the user spots. The sources 77, 78 operate in the same frequency band or in two different but contiguous frequency bands, and the sampled mesh band fractions are contiguous.

Figure 5:
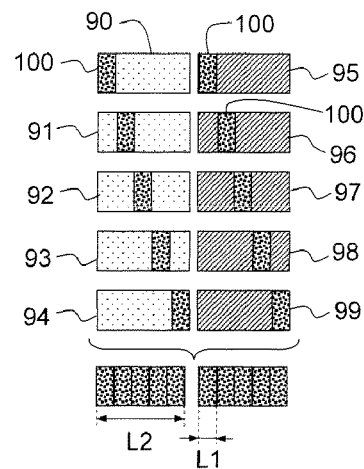
FIG. 5 shows a diagram illustrating the principle for sampling a frequency sub-band corresponding to a fraction of the total band allocated to a spot, for five different spots received using the same frequency band, according to the invention.

As shown in FIG. 5, in the case of an example of reception of ten different spots 90 to 99 using two different but contiguous frequency bands, the mesh band factions 100 sampled on each of the received spots have widths which are identical and frequency-shifted in relation to one another, the shift corresponding to the width L1 of each mesh band fraction in such a way that the mesh band fractions 100 do not comprise a common frequency, are contiguous and the total width of the set of mesh band fractions 100 following recombination is equal to the bandwidth L2 allocated to a user spot 14. The frequency shift of the sub-bands sampled and allocated to the mesh section enables the separation of different received spots with the same colour, i.e. using the same frequency band. The example shown in FIG. 5 illustrates the reception of ten user spots using two different frequency bands, each user frequency band being used by five different user spots. The separation of the different spots is implemented by sampling, in each of these user bands, a mesh band fraction equal to one fifth of the user frequency band, the mesh fractions sampled from one user band to another user band being disjointed and contiguous. Following frequency conversion, the contiguous mesh band fractions sampled and recombined into a single band with the same width L2 as each user band form a single recombined signal applied to the same input access point of the DTP 35. Advantageously, the sampling and recombining means 52 can be input multiplexers (IMUX).

In the DTP 35, the signals applied to the input are filtered and routed in a conventional manner to an output of the DTP 35.

The frequency division and reinjection means 53 comprise filtering means to divide the frequency band routed by the DTP 35 to the same output access point into at least two contiguous frequency band fractions with the same width, and reinjection means to reinject, into each of the two user transmission channels 71, 72 of the outbound section 45, the frequency band fractions obtained after filtering. The filtered and reinjected frequency band fractions correspond to the mesh band fractions sampled in the two user reception channels 73, 74 of the return section 47, and have the same bandwidth L1.

Figure 6:
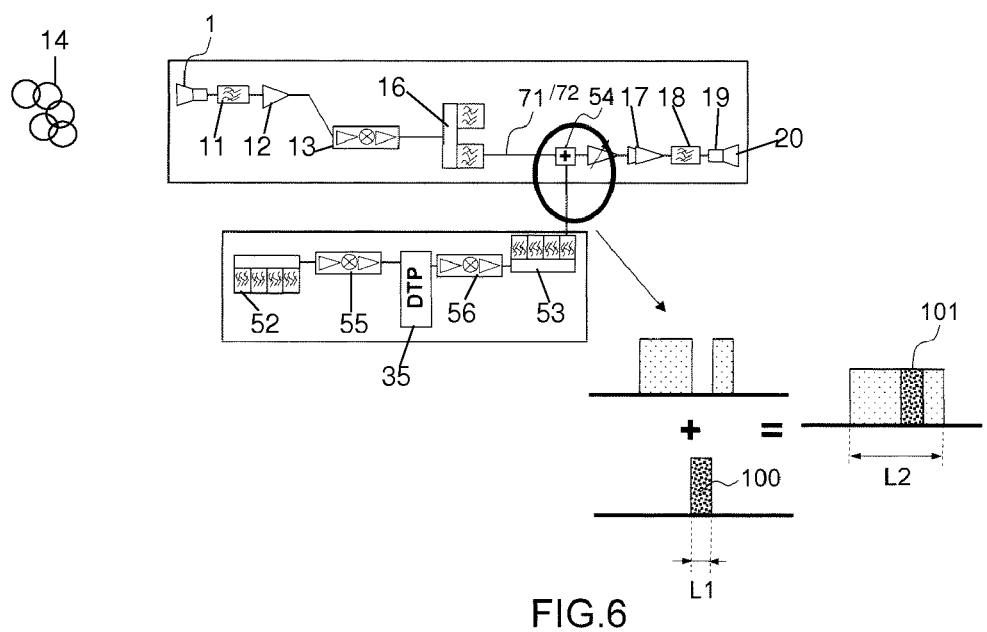
FIG. 6 shows a simplified view, corresponding to the architecture shown in FIG. 4, showing a single connection between an output access point of the DTP and a user transmission channel of an outbound section serving a user spot, according to the invention.

FIG. 6 is a simplified view of the architecture of FIG. 4 showing the principle of reinjection of the missing band fraction into a user transmission channel 71 of an outbound section serving a user spot 14, the reinjection of the missing band fraction enabling reconstitution of the total band allocated to the corresponding user spot 14. For each of the transmission channels 71, 72 and reception channels 73, 74, the mesh frequency band fraction 100 sampled on the reception channel 73 of a user spot 14 is identical to the frequency band fraction 101 reinjected into the transmission channel 71 of the same user spot 14. Thus, each mesh frequency band fraction 100 sampled on reception is reinjected 101 on transmission. Each signal from a user spot is transmitted via the DTP to a different user by using the frequency sub-band corresponding to the sampled mesh frequency band fraction 100. The sampled band fraction 100 is reinjected 101 into a transmission channel 71 of the outbound section and combined, via combination means 54, with the transmission band of the outbound section to form a single signal whose frequency bandwidth is equal to the frequency bandwidth L2 allocated to each user spot 14. Advantageously, the frequency shift and reinjection means 53 can be output demultiplexers (DMUX).

This payload architecture enables at least two user spots to be served on the basis of a single input and output access point of the DTP 35.

In FIG. 4, the return section comprises four radio frequency signal user reception channels 73, 74, and the outbound section comprises four radio frequency signal user transmission channels 71, 72. The mesh section 49 providing inter-spot links between users 14 comprises a DTP 35 comprising a plurality of input and output access points, each input access point being connected to a return section 47 and each output access point being connected to an outbound section 45. The frequency sampling and recombining means of each return section 47 comprise an input multiplexer 52 having four inputs connected respectively to the four user reception channels 73, 74, and an output connected to an input access point of the DTP 35. The multiplexer 52 comprises four filtering channels to sample and filter a fraction of the mesh frequency band of each of the user reception channels 73, 74, the four sampled and filtered mesh frequency band fractions being contiguous and of identical widths L1, each width L1 being equal to one quarter of the width L2 of the total band allocated to a user spot 14. The frequency shift and reinjection means 53 of each outbound section 45 comprise an output demultiplexer 53 having an input connected to an output access point of the DTP 35, and four outputs connected respectively, via respective combiners 54, to the four transmission channels 71, 72 of the user spots 14. The demultiplexer 53 comprises four filtering channels to divide and filter four frequency band fractions identical to the mesh band fractions sampled on the reception channels 73, 74 of the return section 47, the four divided and filtered frequency band fractions being contiguous and of identical widths, each width being equal to one quarter of the width L2 of the total band allocated to a user spot 14.

Thus, for a DTP comprising N input access points and N output access points, and by using IMUXs comprising P inputs and DMUXs comprising P outputs, N being an integer equal to or greater than 1 and P being an integer equal to or greater than 2, the architecture according to the invention enables the direct connection of a number of user spots equal to (N·P) spots.

By way of a non-limiting example, for a frequency band of 2000 MHz allocated to each earth station, i.e. 1000 MHz for two different polarisations and for a frequency band of 500 MHz allocated to each user spot, i.e. 250 MHz outbound and return per spot, 10 earth stations are required to serve 80 user spots, i.e. a total capacity of 20 000 MHz outbound and 20 000 MHz return. With a DTP comprising 8 inputs and 8 outputs of 500 MHz per access point connected to IMUXs and DMUXs, each with 10 channels of 50 MHz, 10 spots can be connected per access point, i.e. 80 spots in total on transmission and 80 spots on reception for the inter-spot links, representing a band of 4000 MHz outbound and 4000 MHz return allocated to the inter-spot links, i.e. 20% of the total capacity allocated to the spots.

This payload architecture has the capacity to serve a large number of inter-spot links, but it does not provide a flexibility of links between the earth stations and the user spots for the outbound and return links. In fact, one earth station serves a predetermined and fixed number of user spots. In the case of a requirement to serve a large number of spots, it is therefore necessary to have a deployment of a plurality of earth stations to enable all of the required links. In the example described above, ten earth stations are necessary to provide links with the 80 user spots.

Figure 7:
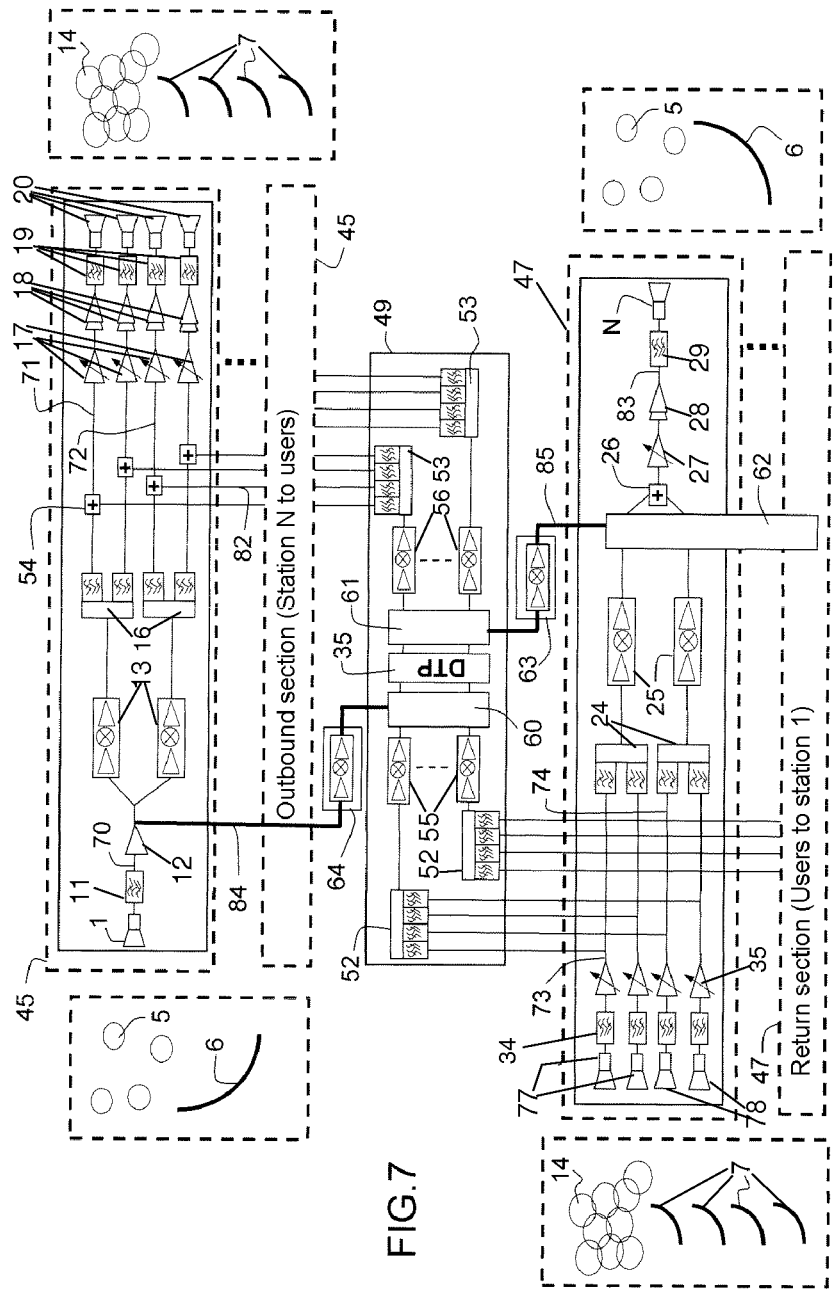
FIG. 7 shows a diagram of an implementation variant of a payload architecture enabling a set of user spots to be served in the case where the number of stations on the ground is insufficient.

FIG. 7 shows an implementation variant of a payload architecture enabling the set of required spots to be served even in the case where the number of earth stations is insufficient. To do this, according to this implementation variant, to implement outbound links between an earth station and additional users, the payload architecture furthermore comprises first selectivity means 60, 61 to connect selectively at least one input access point of the DTP 35 either to user transmission channels 71, 72 of an outbound section 45 to implement an inter-spot link as described with reference to FIG. 4, or to a hub reception channel 70 to implement an additional link 84 between the earth station and the additional users via the DTP 35. Symmetrically, to implement return links of additional users to the earth station, the payload architecture comprises second selectivity means 62 to connect selectively at least one output access point of the DTP 35 either to user reception channels 73, 74 of a return section 47 to implement an inter-spot link, or to a hub transmission channel 83 to implement an additional link 85 with a hub transmission source N of the earth station via the DTP 35.

The first selectivity means comprise a first input selectivity matrix 60 connected to the mesh section between the IMUXs 52 and the inputs of the DTP 35, and a second output selectivity matrix 61 connected to the mesh section 49 between the outputs of the DTP 35 and the DMUXs 53. The first selectivity matrix 60 is connected to the user reception channel of an outbound section via a frequency converter 64. The second selectivity means comprise a third selectivity matrix 62 connected to the user transmission channels of each outbound section 47, between the frequency converters 25 and the signal combiners 26 and connected to the second output selectivity matrix 61 of the mesh section 49 via a frequency converter 63. The first, second and third selectivity matrices implement "exclusive or" functions.

Thus, to implement an outbound link between an earth station and an additional user located in a geographical zone not covered by the fixed user transmission channels of the outbound section dedicated to the earth station, the signals transmitted by the earth station and received by the hub reception source of the outbound section are guided to the first selectivity matrix 60 of the mesh section 49 then routed by the DTP 35 to an output access point of the DTP 35, and guided, via the second selectivity matrix 61, to a user transmission channel covering the geographical zone in which the additional user is located. Advantageously, the user transmission channel covering the geographical zone in which the additional user is located may form part of an outbound section awaiting connection to a future dedicated earth station.

Symmetrically, to implement a return link between an additional user and an earth station, the additional user being located in a geographical zone not covered by the fixed user reception channels of the return section dedicated to the earth station, the signals transmitted by the additional user and received by a user reception channel covering the geographical zone in which the additional user is located are routed in the mesh section 49 to an input of the DTP 35. The DTP 35 routes the received signals to an output access point of the DTP 35 and transmits them, via the second selectivity matrix 62, to the third selectivity matrix 63 which then guides them to the hub transmission channel of the return section 47 dedicated to the earth station.

This payload architecture variant enables a larger number of user spots to be served from a single earth station and in a flexible manner. This architecture also enables the implementation of a progressive rollout of a service to a large number of users by means of temporary links passing through the DTP, which can be used, at the beginning of the rollout, in half to implement outbound links and in half to implement return links. During the course of the construction of the earth stations, the traffic of the communications passing via the DTP can be switched to the outbound and return sections dedicated to the constructed earth stations and replaced by an inter-spot link mesh service between the users. At the end of the rollout of the earth stations, all of the traffic of the communications between the earth stations and the user spots passes via the outbound and return sections dedicated to each earth station, and the DTP is then completely used to provide inter-spot links between the users.

By way of a non-limiting example, for an earth station presenting a frequency band of 1000 MHz per polarisation and operating in two different polarisations, by using a DTP having a processing capacity of 500 MHz per access point and comprising 8 input access points and 8 output access points, and by using IMUXs and DMUXs, each presenting 10 channels of 50 MHz for the connection of 10 spots per access point, it is possible to connect 4 input access points of the DTP to hub reception channels of a station on the ground, 4 other input access points to user reception channels, numbered 40 in the present example, 4 output access points of the DTP to hub transmission channels of an earth station, and 4 other output access points to user transmission channels, i.e. 40 different spots. In this configuration, an earth station having a capacity of 2000 MHz outbound and 2000 MHz return is connected to 40 user spots, each having a capacity of 50 MHz outbound and 50 MHz return.

It is thus possible to envisage serving 80 different user spots with a single earth station, by using a DTP with 12 input access points and 12 output access points on the DTP, 8 access points being connected to user reception channels and 4 access points to hub reception channels.

Although the invention has been described in connection with particular embodiments, is clearly evident that it is in no way limited thereto and that it includes all the technical equivalents of the means described and also their combinations if they fall within the scope of the invention.

The invention claimed is:

1. A multi-spot transmission and reception system on board a satellite, comprising:
   at least one outbound section comprising a hub reception channel intended to receive first signals originating from an earth station and at least two user transmission channels to transmit the first signals to geographical coverage zones corresponding to users, referred to as user spots,
   at least one return section comprising at least two user reception channels intended to receive second signals originating from user spots and a hub transmission channel intended to transmit the second signals to the earth station, and
   an additional link section, being a mesh section, to provide inter-spot links, the mesh section comprising a digital transparent processor (DTP) to filter and route signals from a first user spot to a second user spot, wherein the mesh section further comprises:
   means for frequency sampling and recombining, comprising at least two inputs connected to a return section, and an output connected to an input of the DTP, to sample, respectively, on the at least two user reception channels, two first frequency band fractions, being mesh band fractions, and to recombine the first two sampled mesh band fractions into a single frequency band applied to an input of the DTP,
   frequency division and reinjection means comprising an input connected to an output of the DTP, and at least two outputs connected to an outgoing section, to divide the frequency band routed to the same output of the DTP into at least two second mesh band fractions, and to reinject, respectively on the at least two user transmission channels, the second mesh band fractions obtained following division.

2. The multi-spot transmission and reception system according to claim 1, wherein the frequency sampling and recombining means comprise an input multiplexer (IMUX) and in that the frequency division and reinjection means comprise at least one output demultiplexer (DMUX).

3. The multi-spot transmission and reception system according to claim 1 wherein the mesh band fraction sampled on a user reception channel of a user spot is identical to the mesh band fraction reinjected on a user transmission frequency channel of the same user spot.

4. The multi-spot transmission and reception system according to claim 3, wherein the mesh band fractions sampled on the user reception channels of the same return section all have the same width and are frequency-shifted in relation to one another, the frequency shift being equal to the width of the mesh band fraction, and the sampled mesh band fractions are contiguous.

5. The multi-spot transmission and reception system according to claim 4, wherein the total width of the mesh band fractions sampled on the user reception channels of the same return section is equal to the bandwidth of each user spot.

6. The multi-spot transmission and reception system according to claim 1, further comprising:
first selectivity means to connect selectively at least one input access of the DTP either to the user reception channels or, via at least one additional first link, to a hub reception channel, and
second selectivity means to connect selectively at least one output access point of the DTP either to user transmission channels or, via at least one additional second link, to a hub transmission channel.

7. The multi-spot transmission and reception system according to claim 6, wherein the first selectivity means comprise a first input selectivity matrix connected in the mesh section between the a plurality of multiplexers and the inputs of the DTP, and a second output selectivity matrix connected in the mesh section between the outputs of the DTP and the a plurality of demultiplexers.

8. The multi-spot transmission and reception system according to claim 7, wherein the second selectivity means comprise a third selectivity matrix connected to the user reception channels of each return section and connected to the second output selectivity matrix of the mesh section.

9. The multi-spot transmission and reception system according to claim 8, wherein the first, second and third selectivity matrices implement "exclusive or" functions.

10. A telecommunications satellite comprising a multi-spot transmission and reception system comprising:
at least one outbound section comprising a hub reception channel intended to receive first signals originating from an earth station and at least two user transmission channels to transmit the first signals to geographical coverage zones corresponding to users, referred to as user spots,
at least one return section comprising at least two user reception channels to receive second signals originating from user spts and a hub transmission channel intended to transmit the second signals to the earth station, and
an additional link section, being a mesh section, intended to provide inter-spot links, the mesh section comprising a digital transparent processor (DTP) to filter and route signals from a first user spot to a second user spot, wherein the mesh section further comprises:
means for frequency sampling and recombining, comprising at least two inputs connected to a return section, and an output connected to an input of the DTP, to sample, respectively, on the at least two user reception channels, two first frequency band fractions, being mesh band fractions, and to recombine the first two sampled mesh band fractions into a single frequency band applied to an input of the DTP,
frequency division and reinjection means comprising an input connected to an output of the DTP, and at least two outputs connected to an outgoing section, to divide the frequency band routed to the same output of the DTP into at least two second mesh band fractions, and to reinject, respectively on the at least two user transmission channels, the second mesh band fractions obtained following division.

* * * * *

UNITED STATES PATENT AND TRADEMARK OFFICE
CERTIFICATE OF CORRECTION

PATENT NO. : 8,542,626 B2
APPLICATION NO. : 12/972059
DATED : September 24, 2013
INVENTOR(S) : Philippe Voisin, Didier Leboulc'h and Bruno Trancart It is certified that error appears in the above-identified patent and that said Letters Patent is hereby corrected as shown below:

Title page, Item (75) Inventors:

Replace "Ville" with --Toulouse--.

Signed and Sealed this
Thirty-first Day of December, 2013

Margaret A. Focarino
*Commissioner for Patents of the United States Patent and Trademark Office*